(12) United States Patent
Alvarez Cavazos et al.

(10) Patent No.: US 8,977,532 B2
(45) Date of Patent: Mar. 10, 2015

(54) ESTIMATING TIME REMAINING FOR AN OPERATION

(71) Applicant: Microsoft Corporation, Redmond, WA (US)

(72) Inventors: Francisco Alvarez Cavazos, Bothell, WA (US); Jordi Mola, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

(21) Appl. No.: 13/774,901

(22) Filed: Feb. 22, 2013

(65) Prior Publication Data
US 2014/0244979 A1 Aug. 28, 2014

(51) Int. Cl.
G06F 17/50 (2006.01)
G06F 9/30 (2006.01)
G06F 11/32 (2006.01)
G06F 11/34 (2006.01)

(52) U.S. Cl.
CPC .................. G06F 9/30 (2013.01); G06F 11/32 (2013.01); G06F 11/3419 (2013.01); G06F 11/3452 (2013.01)
USPC .......................................................... 703/17

(58) Field of Classification Search
CPC ....................... G06F 17/30115; G06F 17/5031
USPC .......................................................... 703/17
See application file for complete search history.

(56) References Cited

U.S. PATENT DOCUMENTS

| 5,758,161 A | 5/1998 | Reynolds |
| 6,275,987 B1 | 8/2001 | Fraley et al. |
| 6,874,130 B1 * | 3/2005 | Baweja et al. ................. 715/805 |
| 8,117,415 B2 | 2/2012 | Perry |
| 8,122,448 B2 | 2/2012 | Riddick |
| 2001/0055017 A1 * | 12/2001 | Ording ........................... 345/440 |

(Continued)

FOREIGN PATENT DOCUMENTS

| EP | 0515136 | 11/1992 |
| JP | H04305740 | 10/1992 |

OTHER PUBLICATIONS

Iqbal, Azlan "Estimating Time to Completion Uncertain Processing Times in Games", *The 16th International Conference on Computer Games*, Jul. 27-30, 2011, retrieved from <http://ieeexplore.ieee.org/stamp/stamp.jsp?tp=&arnumber=6000360> on Nov. 28, 2011,(Jul. 27, 2011), pp. 59-62.

(Continued)

*Primary Examiner* — Dwin M Craig
(74) *Attorney, Agent, or Firm* — John Jardine; Kate Drakos; Mickey Minhas

(57) ABSTRACT

Techniques for estimating time remaining for an operation are described. Examples operations include file operations, such as file move operations, file copy operations, and so on. A wide variety of different operations may be considered in accordance with the claimed embodiments, further examples of which are discussed below. In at least some embodiments, estimating a time remaining for an operation can be based on a state of the operation. A state of an operation, for example, can be based on events related to the operation itself, such as the operation being initiated, paused, resumed, and so on. A state of an operation can also be based on events related to other operations.

20 Claims, 11 Drawing Sheets

(56) References Cited

U.S. PATENT DOCUMENTS

| | | |
|---|---|---|
| 2002/0003941 A1 | 1/2002 | Hatae et al. |
| 2005/0097480 A1* | 5/2005 | Care .......................... 715/859 |
| 2007/0204270 A1 | 8/2007 | Shin |
| 2010/0058120 A1 | 3/2010 | Coleman et al. |
| 2010/0083159 A1 | 4/2010 | Mountain |
| 2011/0071987 A1* | 3/2011 | Davis et al. .................. 707/687 |

OTHER PUBLICATIONS

Mathews, Lee "Windows 8 Explorer: Improved Copy, Delete, and Conflict Resolution", Retrieved from <http://www.extremetech.com/computing/93822-windows-8-explorer-to-feature-improved-copy-move-delete-and-conflict-resolution>, (Aug. 24, 2011), 11 pages.

"International Search Report and Written Opinion", Application No. PCT/US2014/016746, Apr. 25, 2014, 11 Pages.

\* cited by examiner

ESTIMATING TIME REMAINING FOR AN OPERATION

BACKGROUND

For various operations, knowing how long an operation will take to complete and/or how much time is remaining to operation completion can be very useful. For instance, data operations on a computing device (e.g., moving data, deleting data, copying data, and so on) can utilize device resources. Thus, providing an accurate estimate of when a data operation will be complete can assist a user in assessing when associated device resources will be free for other operations or tasks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for estimating time remaining for an operation are described. Examples operations include file operations, such as file move operations, file copy operations, and so on. A wide variety of different operations may be considered in accordance with the claimed embodiments, further examples of which are discussed below. In at least some embodiments, estimating a time remaining for an operation can be based on a state of the operation. A state of an operation, for example, can be based on events related to the operation itself, such as the operation being initiated, paused, resumed, and so on. A state of an operation can also be based on events related to other operations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
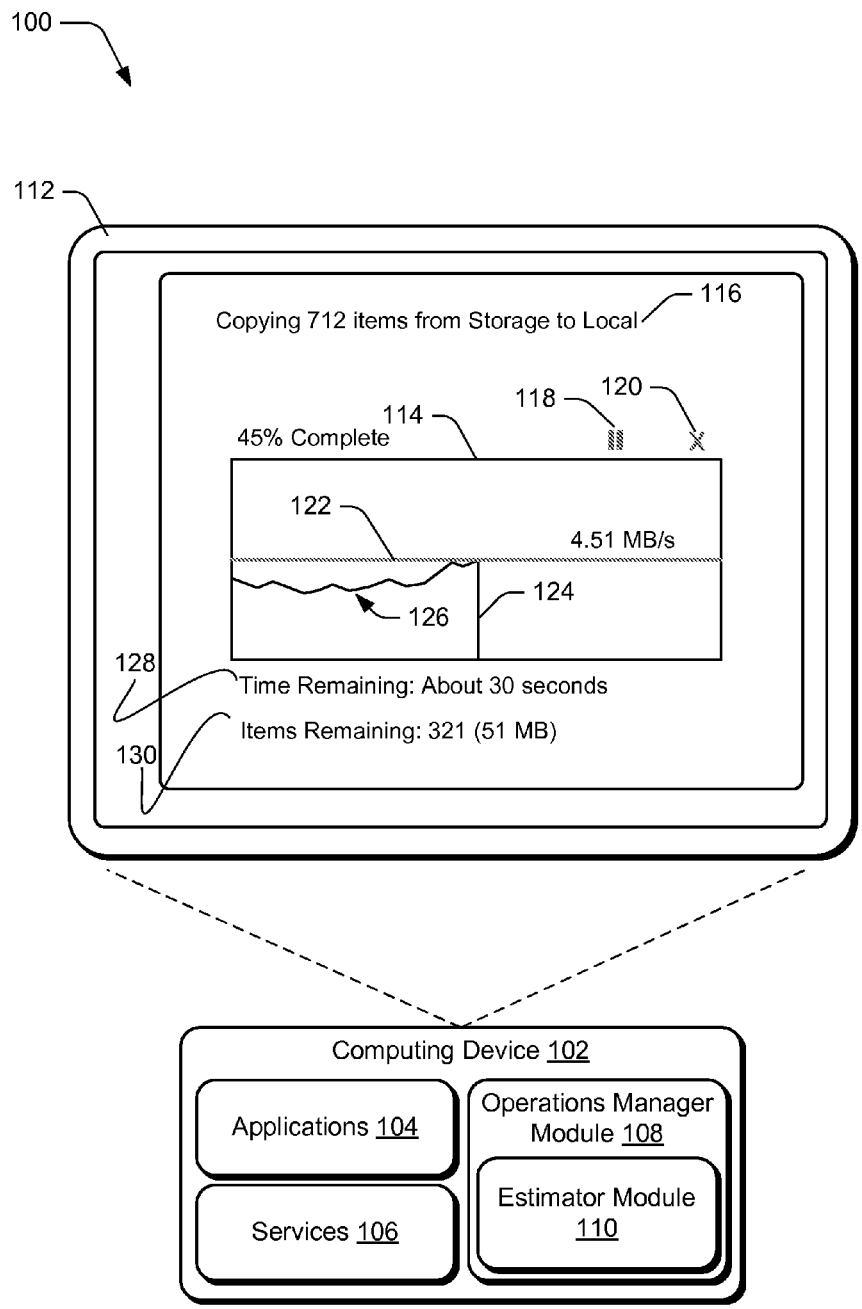
FIG. 1 is an illustration of an environment in an example implementation that is operable to employ techniques discussed herein.

Techniques for estimating time remaining for an operation are described. Examples operations include file operations, such as file move operations, file copy operations, and so on. A wide variety of different operations may be considered in accordance with the claimed embodiments, further examples of which are discussed below. In at least some embodiments, estimating a time remaining for an operation can be based on a state of the operation. A state of an operation, for example, can be based on events related to the operation itself, such as the operation being initiated, paused, resumed, and so on. A state of an operation can also be based on events related to other operations.

For instance, consider an example scenario that involves files being moved from one location to another, such as between file storage locations. According to various embodiments, a graphical user interface can be presented that includes visual indicia of various information concerning the file move operation. Examples of such information include an amount of work to be done for the operation, e.g., a number of files and/or an amount of data to be moved. The information can also include a rate at which the file move operation is occurring, a progress of the operation (e.g., how many files and/or how much data has been moved), how much work remains to be done for the operation, and so on.

Further to the example scenario, the graphical user interface includes a visual indication of an estimated time remaining for the operation. The time remaining, for example, can be indicated in terms of hours, minutes, seconds, and so on. Based on various states of the operation, time remaining for the operation can be estimated, such as periodically and/or in response to various events that affect an operation. The visual indication of the time remaining can be updated to reflect the estimated time remaining. As detailed herein, techniques for estimating a time remaining for an operation can be employed to account for changes in operation state while providing a stable user experience for monitoring progress of an operation.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example methods in accordance with one or more embodiments. Next, a section entitled "Other Embodiments" describes some further example implementations of techniques discussed herein in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for estimating time remaining for an operation described herein. The illustrated environment 100 includes a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 11.

Thus, the computing device 102 may range from a full resource device with substantial memory and processor resources (e.g., personal computers, game consoles, slate or tablet-form factor device) to a low-resource device with limited memory and/or processing resources (e.g., traditional set-top boxes, hand-held game consoles). The computing device 102 also includes software that causes the computing device 102 to perform one or more operations as described herein.

Computing device 102 includes applications 104 and services 106, which are representative of functionalities to perform various tasks via the computing device 102. Examples of the applications 104 include a word processor application, an email application, a content editing application, a web browsing application, and so on. The services 106 are representative of functionalities that can be employed by the computing device 102 to perform tasks, such as file operations, data processing operations, event notifications, and so on. Examples of file operations that can be performed and/or managed by the services 106 include copying files, moving files, deleting files, downloading and/or uploading files, recycling files, renaming files, changing file attributes (e.g., changes to file metadata), and so on.

The computing device 102 further includes an operations manager module 108 that is representative of functionality to manage various operations for the computing device 102, such as for the applications 104, the services 106, and so on. Examples of such operations include file operations (e.g., as mentioned above), diagnostic operations, update operations, security operations, and so forth. A wide variety of other operations may be managed via the operations manager module 108 in accordance with the claimed embodiments.

Further included as part of the computing device 102 is an estimator module 110, which is representative of functionality to perform at least some aspects of the techniques for estimating time remaining for an operation discussed herein. For example, consider an operations user interface (UI) 112, which includes an operations chart 114 that provides a visual indication of status for various operations. The operations chart 114, for instance, can indicate a rate at which an operation is currently occurring. The operations chart 114 also indicates progress of an operation, e.g., what percentage of an operation is completed and/or how much of the operation remains to be completed.

The operations UI 112 includes a description portion 116, which includes information about a particular operation being tracked via the operations chart 114. In this example, the description portion 116 indicates that a status of a file copy operation is being tracked. This operation is presented for purpose of example only, and a wide variety of different operations and/or resources can be tracked in accordance with the claimed embodiments.

The operations chart 114 further includes a pause control 118 and a cancel control 120. The pause control 118 is selectable to suspend an operation that is being tracked via the operations chart 114, and the cancel control 120 is selectable to cancel such an operation. As discussed elsewhere herein, when the pause control 118 is selected and an operation is suspended, a resume control can be displayed that is selectable to resume the operation.

A value mark 122 is included as part of the operations chart 114, and provides a graphical indication of a current value for an operation that is being tracked. For instance, the value mark 122 can correspond to a particular value or range of values for a rate of an operation, such as a data rate. In this example, the value mark 122 indicates a current download speed for a file download operation. The value mark 122 can move upward and downward within the operations chart 114 to visually indicate changes in operation values.

The operations chart 114 further includes a progress mark 124 and a history line 126. The progress mark 124 is positioned to indicate a current operation progress, such as with reference to total operation units to be completed. For instance, the progress mark 124 can be positioned at various points within the operations chart 114 to indicate different progress points for an operation.

The history line 126 is representative of historical values for an operation. For instance, the history line 126 can connect data points that correspond to values that occur temporally prior to the progress mark 124. Thus, in at least some implementations, the progress mark 124 can traverse from left to right within the operations chart 114 as an operation progresses. Further, as the progress mark 124 traverses within the operations chart 114, the history line 126 can indicate previous operation values, e.g., previous values at different progress points.

The operations UI 112 also includes a time estimate 128 and an items remaining indicator 130. The time estimate 128 includes a visual indication of an estimated time remaining until an operation associated with the operations chart 114 will be completed. According to various embodiments, the estimator module 110 can estimate a time remaining to operation completion based on various information and different parameters. For instance, the estimator module 110 can monitor operation state and adjust a time remaining estimate for an operation based on a change to operation state. Thus, as an operation progresses towards completion and/or other events occur, the time estimate 128 can be updated to reflect changes in operation progress. Further operational aspects of the estimator module 110 are detailed elsewhere herein.

The items remaining indicator 130 provides an indication of a number of operation items that remain to be completed in an operation. Items remaining, for instance, can refer to a number of work units that remain to be completed, such as a number of files that remain to be copied, a number of bytes that remain to be sent or received via the computing device 102, and so forth. Thus, in at least some embodiments an operation can be abstracted as a total number of work units. The items remaining indicator 130 can display a number of work units that remain to be completed from a total number of work units. Alternatively or additionally, the items remaining indicator can be implemented as an items completed indicator, that indicates a number of work units that have been completed at a particular operation progress point.

Having described an example environment in which the techniques described herein may operate, consider now a discussion of some example implementation scenarios in accordance with one or more embodiments.

Example Implementation Scenarios

The following discussion describes some example implementation scenarios for estimating time remaining for an operation in accordance with one or more embodiments. In portions of the following discussion, reference will be made to various aspects of the environment 100 of FIG. 1.

Figure 2:
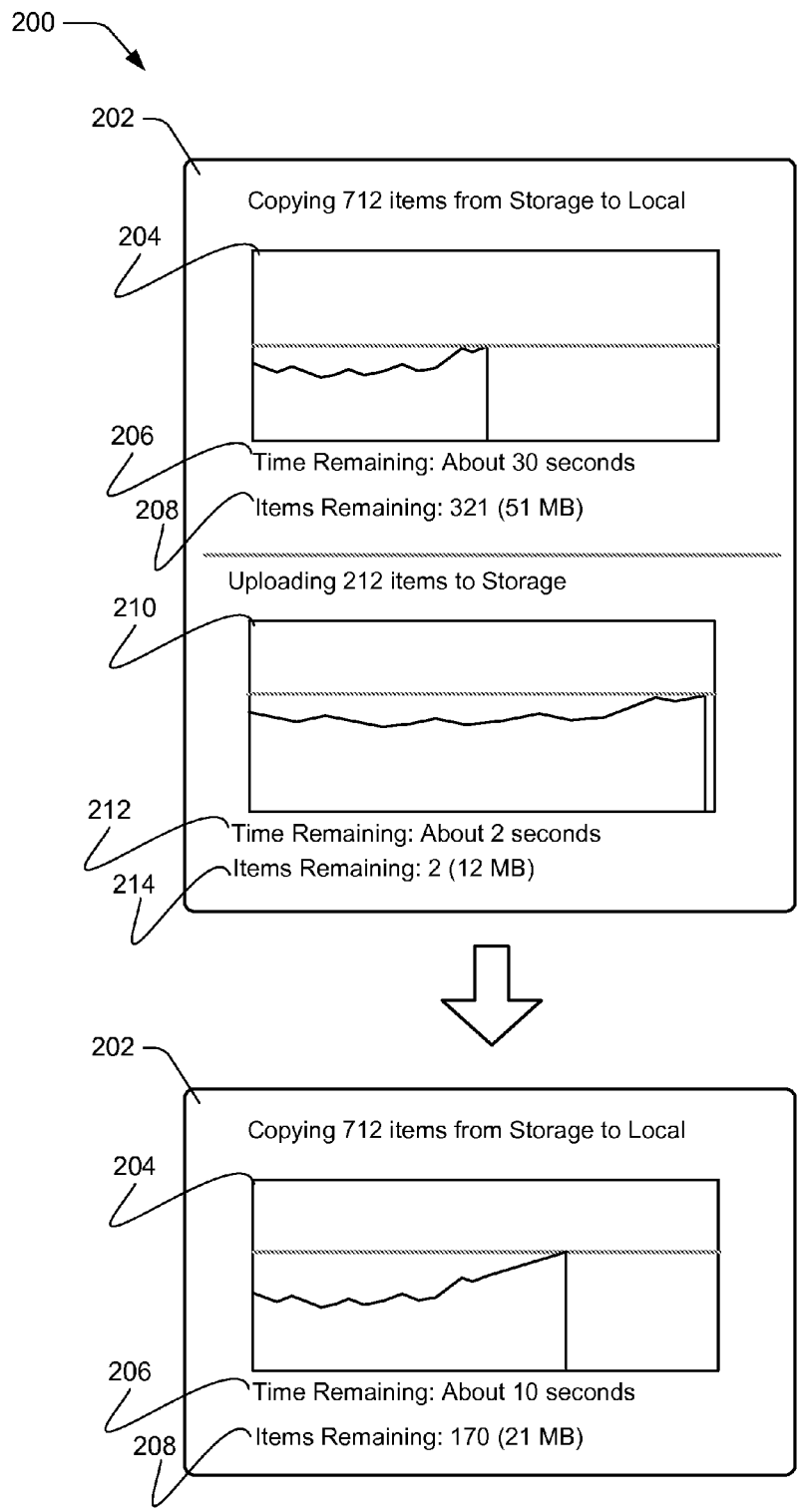
FIG. 2 illustrates an example implementation scenario in accordance with one or more embodiments.

FIG. 2 illustrates an example implementation scenario, generally at 200. The upper portion of the scenario 200 includes an operations UI 202, which is configured to display information about operations. The operations UI 202 includes an operation chart 204, which displays information about an ongoing file copy operation. A time estimate 206 displays an estimated time remaining for the file copy operation, and an items remaining indicator 208 displays a number of items (e.g., files) remaining to be copied as part of the operation.

The operations UI 202 further includes an operation chart 210, which displays information about an ongoing file upload operation. A time estimate 212 displays an estimated time remaining for the file upload operation, and an items remaining indicator 214 displays a number of items (e.g., files) remaining to be uploaded. As illustrated, the time estimate 212 indicates that the upload operation has approximately 2 seconds until completion, and is thus nearly complete.

Proceeding to the lower portion of the scenario 200, the file upload operation associated with the operation chart 210 is completed, and thus the operation chart 210 is removed from the operations UI 202. Further, the operations UI 202 is resized since the operation chart 210 is no longer displayed.

Completion of the upload operation associated with the operation chart 210 causes a recalculation of an estimated completion time for the file copy operation associated with the operation chart 204. For instance, a notification of a change in operation state caused by completion of the file upload operation can be generated and sent to the estimator module 110. In response to the notification, the estimator module 110 can recalculate an estimated time remaining for the file copy operation associated with the operation chart 204. The time estimate 206 can be updated based on the recalculated time estimate.

For instance, consider that resources (e.g., device resources, network resources, and so on) that were being used to perform the now-completed upload operation associated with the operation chart 210 are now available. Such resources are made available to complete the file copy operation associated with the operation chart 204, thus causing an increase in a rate at which the file copy operation progresses. Thus, a time estimate to completion is recalculated based on the increased operation rate to provide a more accurate estimate than would be provided based on a previous rate. Further details are provided below concerning estimating time remaining based on various events.

Based on the recalculated completion time estimate, the time estimate 206 is updated to reflect a new estimated time to completion. The items remaining indicator 208 is updated to reflect a number of items remaining to be copied.

Figure 3:
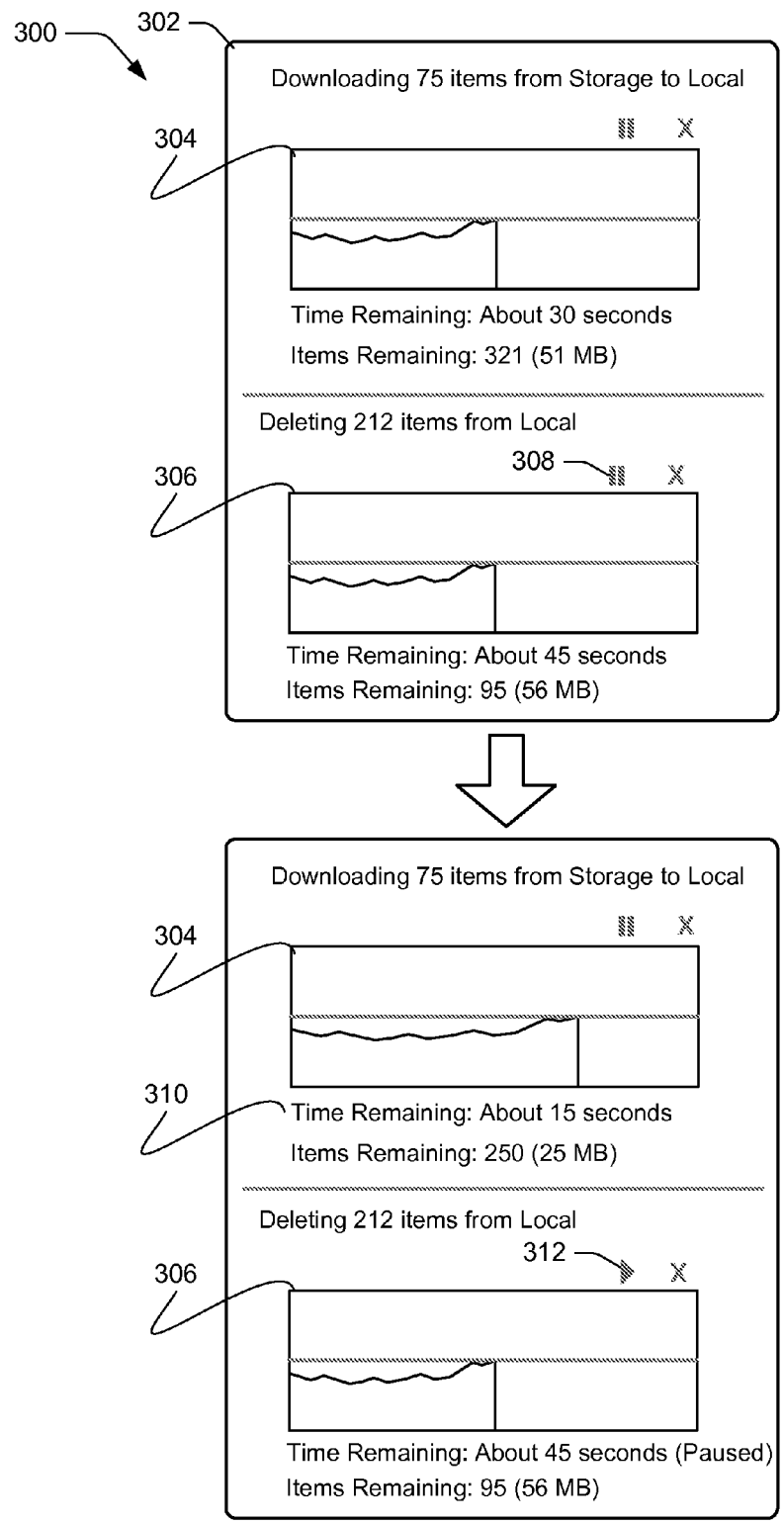
FIG. 3 illustrates an example implementation scenario in accordance with one or more embodiments.

FIG. 3 illustrates an example implementation scenario, generally at 300. The upper portion of the scenario 300 includes an operations UI 302, which includes an operation chart 304 and an operation chart 306. As illustrated, the operation chart 304 tracks progress for a file download operation, and the operation chart 306 tracks progress for a file delete operation.

Further to the scenario 300, a user selects a pause control 308 associated with the operation chart 306. Selection of the pause control 308 causes the file delete operation to be paused, e.g., suspended.

Continuing to the lower portion of the scenario 300, pausing the file delete operation causes a recalculation of a completion time for the file download operation associated with the operation chart 304. For instance, resources that were being used to perform the now-paused delete operation can be available to perform the file download operation. The increase in resources can cause a corresponding increase in a rate at which the file download operation proceeds.

Responsive to recalculation of the completion time for the file download operation, a time estimate 310 for the file download operation is updated to reflect the recalculated time.

As further illustrated, selection of the pause control 308 causes a resume control 312 to be displayed. The resume control 312 is selectable to cause the file delete operation to be resumed, e.g., from a point at which the file delete operation was paused.

In at least some embodiments, an operation can be automatically paused in response to an event, such as a conflict that occurs during an operation. Example implementations for automatically pausing an operation are discussed below.

Figure 4:
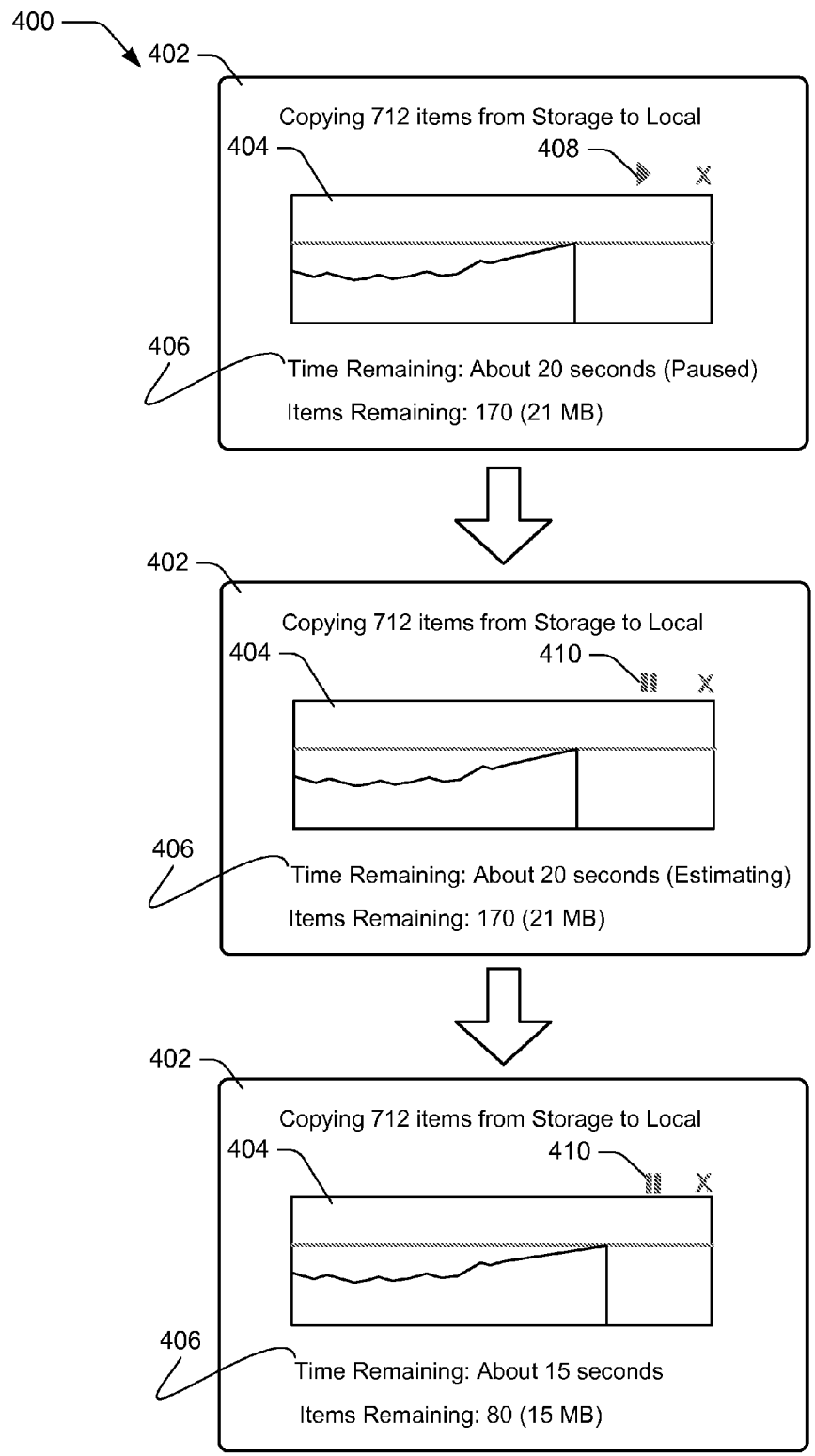
FIG. 4 illustrates an example implementation scenario in accordance with one or more embodiments.

FIG. 4 illustrates an example implementation scenario, generally at 400. The upper portion of the scenario 400 includes an operations UI 402, which in turn includes an operation chart 404. As illustrated, the operation chart 404 tracks progress for a file copy operation.

As indicated by a time estimate 406, the file copy operation has an estimated 20 seconds remaining to completion, and is currently in a paused state. For instance, a pause control associated with the operation chart 404 may have been selected. The operations UI 402 also includes a resume control 408, which is selectable to cause the file copy operation to resume from the paused state.

Continuing to the center portion of the scenario 400, the resume control 408 is selected, e.g., via user input. Responsive to selection of the resume control 408, the file copy operation resumes. The time estimate 406 indicates that the time remaining is currently being estimated, e.g., in response to the file copy operation being resumed. Further, the resume control 408 is replaced with a pause control 410.

Continuing on to the lower portion of the scenario 400, the time remaining is recalculated according to techniques discussed herein, and the time estimate 406 is updated to reflect the recalculated time remaining for the file copy operation. As illustrated, the "Estimating" indicia is removed from the time estimate 406 to reflect that the time remaining has been recalculated and displayed.

Thus, the scenario 400 illustrates that embodiments can be employed to pause and resume various operations, and that techniques discussed herein can accurately re-estimate a time remaining for an operation when the operation is resumed from a suspended state.

Figure 5:
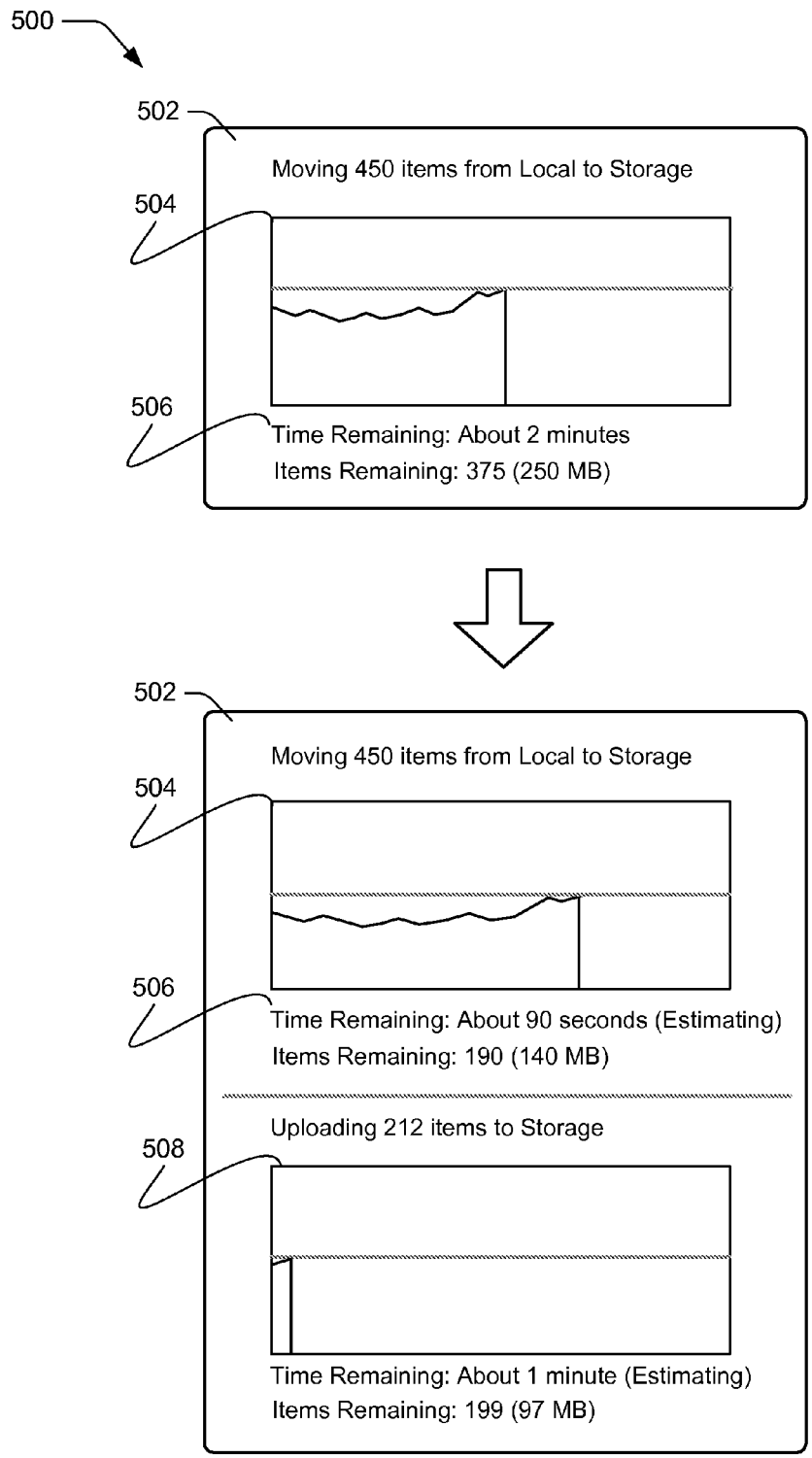
FIG. 5 illustrates an example implementation scenario in accordance with one or more embodiments.

FIG. 5 illustrates an example implementation scenario, generally at 500. According to least some embodiments, the scenario 500 demonstrates an example implementation where initiation of additional operations causes a recalculation of a time remaining estimate for a currently ongoing operation.

The upper portion of the scenario 500 includes an operations UI 502, which in turn includes an operation chart 504. As illustrated, the operation chart 504 tracks progress for a file move operation. The operations UI 502 further includes a time estimate 506, which indicates an estimated time until completion of the file move operation.

Proceeding to the lower portion of the scenario 500, a file upload operation is initiated in addition to the file move operation. For instance, while the file move operation is ongoing, a user and/or other entity can initiate the file upload operation. In response to initiation of the file move operation, an operation chart 508 is added to the operations UI 502 to track progress of the file upload operation.

Initiation of the file upload operation also causes a recalculation of the time remaining for the file move operation associated with the operation chart 504. For instance, at least some resources being used to perform the file move operation can be diverted to assist in performing the file upload operation. Thus, the file move operation may progress more slowly based on the diminished resources.

To reflect the recalculation of the time remaining for the file move operation, the time estimate 506 indicates that the time remaining is being estimated ("Estimating"). Thus, the time estimate 506 can provide a visual indication that an event (e.g., initiation of the file upload operation) has caused a change in the progress of the file move operation, and that an estimated time to completion for the file move operation is currently being estimated.

While not expressly illustrated here, responsive to the remaining time for the file move operation being recalculated, the time estimate 506 can be updated with the remaining time. Further, the "Estimating" indicia can be removed from the time estimate 506 to indicate that a newly recalculated time estimate is displayed.

Figure 6:
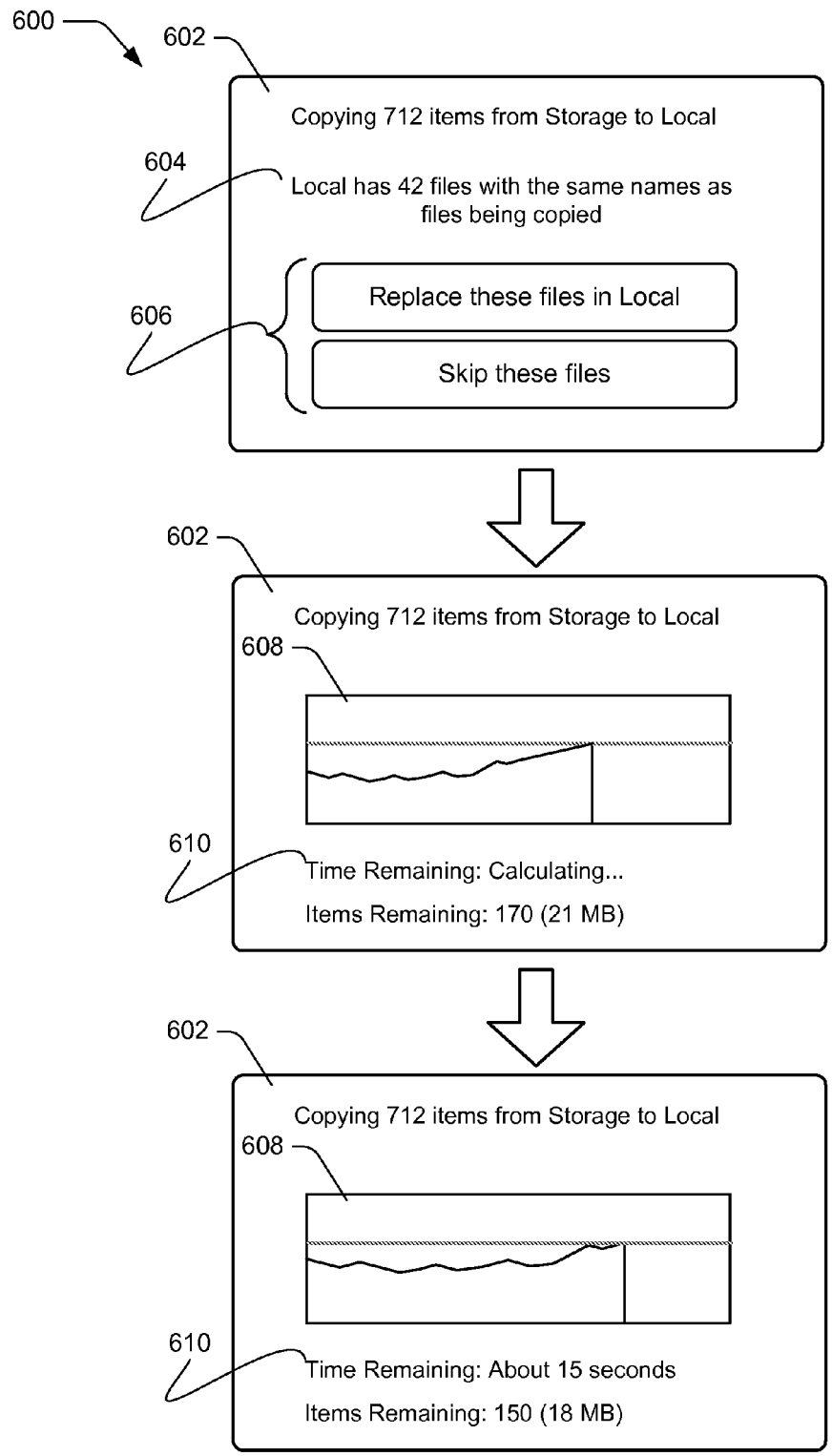
FIG. 6 illustrates an example implementation scenario in accordance with one or more embodiments.

FIG. 6 illustrates an example implementation scenario, generally at 600. According to least some embodiments, the scenario 600 demonstrates an example implementation where an operation resumes after an operation conflict is resolved.

The upper portion of the scenario 600 illustrates an operations UI 602 which tracks various aspects of operations. In this example, the operations UI 602 includes information about a file copy operation. Further to the scenario 600, a conflict occurs during the file copy operation. As indicated by a conflict notification 604, a name conflict occurs between files that are being copied and files already stored in the copy destination.

In response to the conflict, the file copy operation is automatically paused to provide an opportunity to resolve the conflict. For instance, conflict options 606 are presented, which present options for handling the conflict. In at least some embodiments, the conflict options 606 are selectable controls that if selected, cause an associated action to occur.

Proceeding to the center portion of the scenario 600, one of the conflict options 606 is selected, which causes a corresponding action to occur and the file copy operation to resume. For instance, an operation chart 608 provides a visual indication that the file copy operation has resumed, such as via movement of a progress indicator, a rate indicator, and so forth.

A time estimate 610 is included, which indicates that a time remaining for the file copy operation is being calculated. Responsive to resumption of the file copy operation, for instance, a time remaining can be recalculated from a previously-calculated time estimate according to techniques discussed herein.

Continuing to the lower portion of the scenario 600, the time remaining for the file copy operation is recalculated, and the time estimate 610 is updated to reflect the recalculated time estimate. Thus, when operation conflicts occur, techniques can be utilized to recalculate remaining time for an operation after the conflicts have been removed and/or resolved.

The scenarios and user interfaces illustrated herein are presented as example implementations only, and embodiments discussed herein can be employed according to a wide variety of different implementation scenarios and utilizing a variety of different visualizations not expressly illustrated or discussed herein. Techniques, for example, can be utilized with different progress indicators, such as progress bars, pie charts, different graph implementations, and so on. For instance, visual aspects of the user interfaces discussed above can implemented and combined in a variety of different ways without departing from the spirit and scope of the claimed embodiments.

Having discussed some example implementation scenarios, consider now a discussion of some example procedures in accordance with one or more embodiments.

Example Procedures

The following discussion describes some example procedures for estimating time remaining for an operation in accordance with one or more embodiments. The example procedures may be employed in the environment 100 of FIG. 1, the system 1100 of FIG. 11, and/or any other suitable environment. The implementation scenarios discussed above, for example, can be implemented utilizing various aspects of the example procedures.

Figure 7:
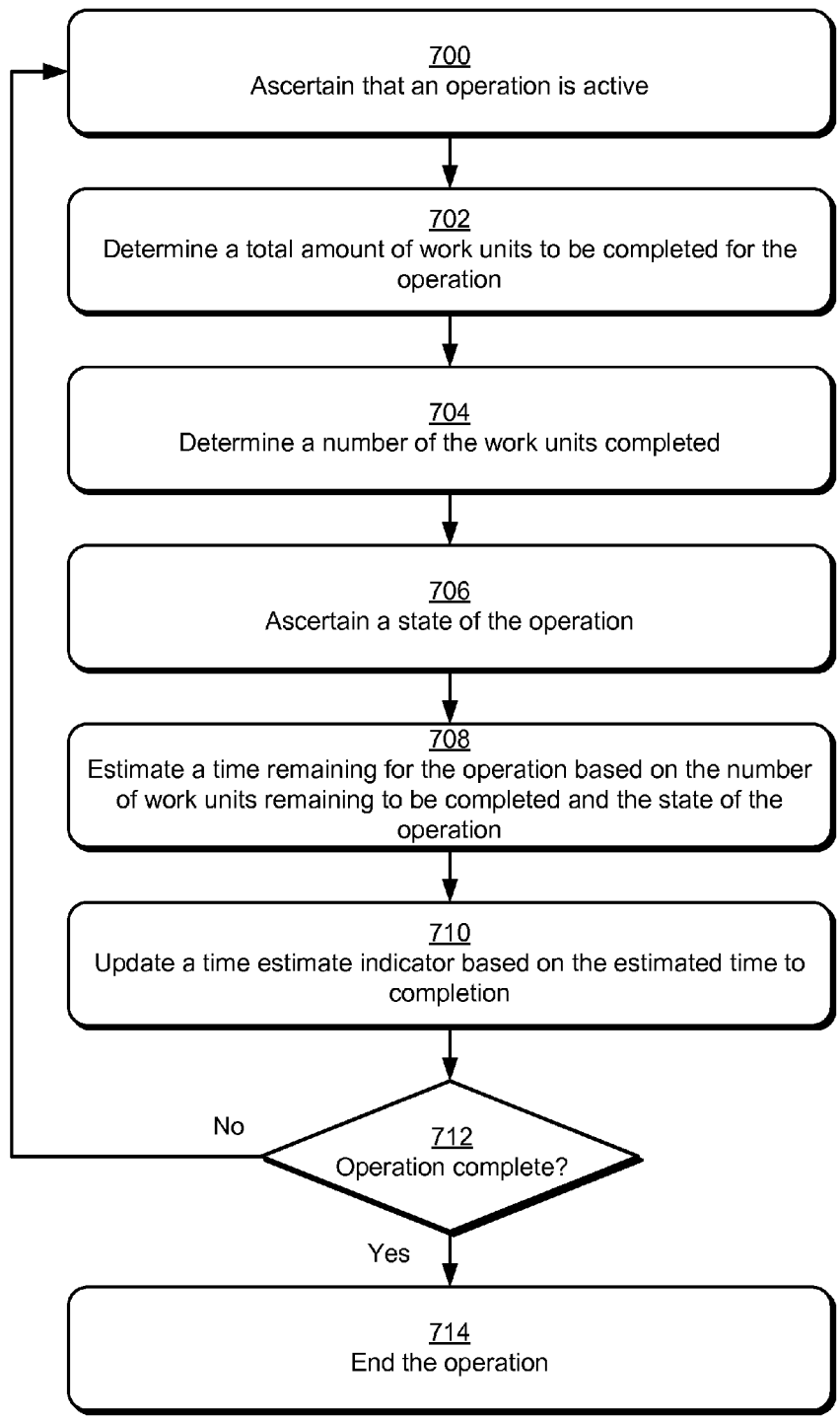
FIG. 7 is a flow diagram that describes steps in a method in accordance with one or more embodiments.

FIG. 7 is a flow diagram that describes steps in a method in accordance with one or more embodiments. Step 700 ascertains that an operation is active. The operations manager module 108, for instance, can determine that an operation is initiated and/or is active. In at least some embodiments, an application and/or service associated with the operation can generate a notification that the operation is initiated and/or active.

Step 702 determines a total amount of work units to be completed for the operation. Various types of work units can be considered, such as an amount of data for an operation. Amounts of data can be measured using a variety of different units, such as bits, bytes, and so forth. As another example, units can be based on discrete items, such as instances of files, blocks of data, and so on. For example, with reference to an operation that moves data from one location to another, work units can refer to a total amount of data to be moved in data units, a total number of data files to be moved, and so forth. A wide variety of other work units may be utilized in accordance with the claimed embodiments.

Step 704 determines a number of the work units completed. For example, the number of work units completed can be determined at various progress points during an operation.

Step 706 ascertains a state of the operation. As discussed in more detail below, an operation can have various states. Examples of operation states include operation initiation, operation alert (e.g., in response to other events), regular progress of an operation, and so forth.

Step 708 estimates a time remaining for the operation based on the number of work units remaining to be completed and the state of the operation. For instance, a time remaining estimate can be calculated based on parameters and other factors that may vary based on different operation states. Further details concerning estimating the time remaining are provided below.

Step 710 updates a time estimate indicator based on the estimated time to completion. For example, a visual indication of a time remaining can be updated to reflect the estimated time to completion of the operation. Other types of time estimate indicators may additionally or alternatively be employed, such as an audible indicator.

Step 712 ascertains whether the operation is complete. If the operation is not complete ("No"), the process returns to step 700. For example, time remaining for an operation can be continually and/or incrementally estimated and updated as the operation progresses and until the operation is complete. If the operation is complete ("Yes"), step 714 ends the operation.

Figure 8:
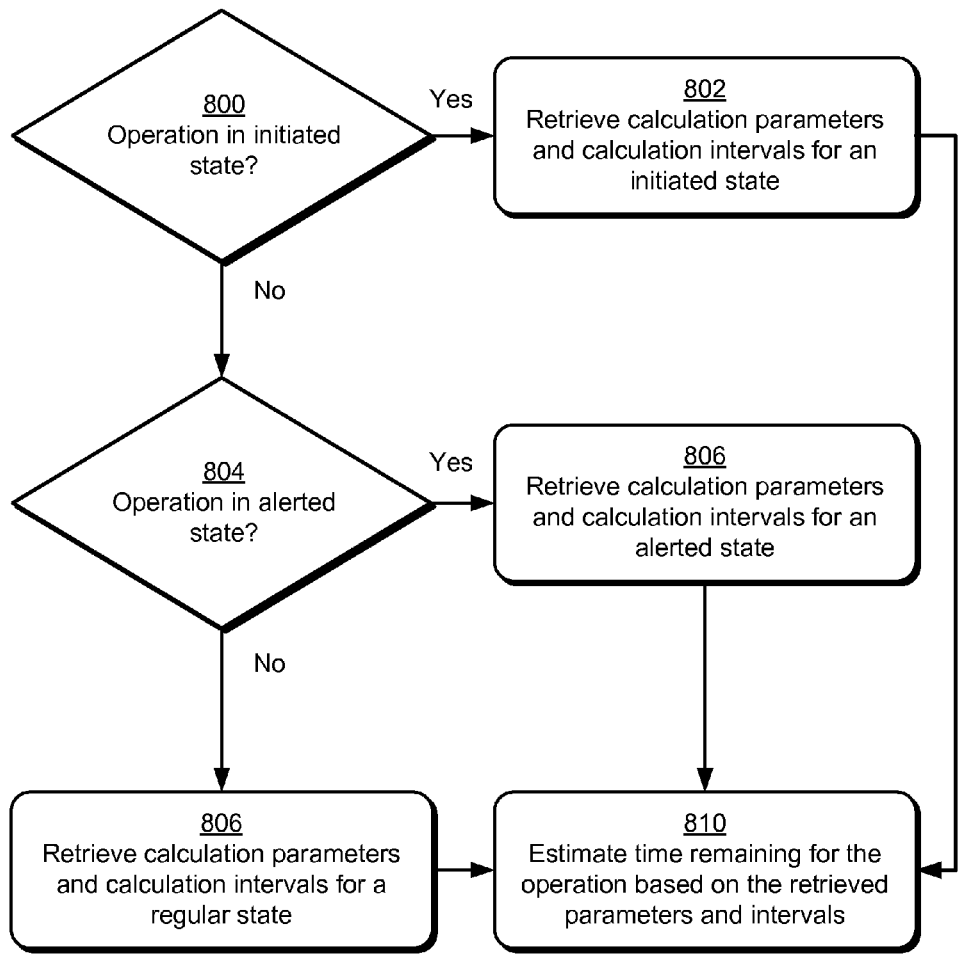
FIG. 8 is a flow diagram that describes steps in a method in accordance with one or more embodiments.

FIG. 8 is a flow diagram that describes steps in a method in accordance with one or more embodiments. According to at least some embodiments, the method describes an example implementation of determining time estimation parameters for estimating a time remaining for an operation, such as discussed with reference to step 708 of FIG. 7. The time estimation parameters, for example, can be determined based on the operation state determined at step 706 of FIG. 7.

Step 800 determines whether an operation is in an initiated state. An initiated state, for example, can correspond to an initial time period at the beginning of an operation. In at least some embodiments, the initial time period can be defined using a specified time increment measured from a beginning of an operation, such as 1 second, 2 seconds, 5 seconds, and so on.

If the operation is in an initiated state ("Yes"), step 802 retrieves calculation parameters and calculation intervals for an initiated state. According to various embodiments, calculation parameters specify how much weight is given to various measurements that are used to estimate a time remaining for an operation. For instance, calculation parameters can include weighting functions that can be applied to rate measurements and/or time estimates for an operation.

According to various embodiments, a calculation interval refers to a period of time over which measurements are taken, such as rate measurements, measurements of how many work units have been completed, and so forth. Thus, different calculation intervals can be used for different operation states, and discussed in detail below.

If the operation is not in an initiated state ("No"), step 804 determines whether the operation is in an alerted state. An alerted state, for instance, corresponds to indicia of various events, such as a notification that a certain event has happened, is happening, and/or is about to occur. Examples of such events include changes in operation state for an operation, such as an operation pause event, an operation resume event, an operation complete event, a new operation event, and so on. An alert can be generated based on a change to an event for which the time remaining is being estimated, and/or for a different operation, such as an operation that is occurring concurrently.

Alerts may also be generated based on other events, such as resource change events, user activity events, and so on. Examples of resource change events include an increase or decrease in network bandwidth, a change in processor availability, and so on. Examples of user activity events include user interactions with various functionalities, such as applications, services, and so on. Thus, in at least some embodiments, an alert can be generated and time remaining recalculated based on an event that is not expressly being displayed to a user, such as background events.

If the operation is in an alerted state ("Yes"), step 806 retrieves calculation parameters and calculation intervals for an alerted state. If the operation is not in an alerted state ("No"), step 808 retrieves calculation parameters and calculation intervals for a regular state. According to various embodiments, a regular state refers to an operation state that occurs when an operation is ongoing for a particular period of time after operation initiation and without experiencing an alert event. For instance, a regular state can refer to a "normal" operating condition for an operation.

A regular state, for example, can be based on a timer that starts at operation initiation and/or after an alert. When the timer expires (e.g., without interruption from an alert), an operation can be considered to be in a regular state. If an alert condition occurs while the timer is elapsing, the timer can be reset and/or restarted. Any suitable time period can be utilized, such as 2 seconds, 5 seconds, and so forth.

Step 810 estimates time remaining for the operation based on the retrieved parameters and intervals. A detailed example of calculating time remaining based on parameters and intervals is presented hereafter.

Figure 9:
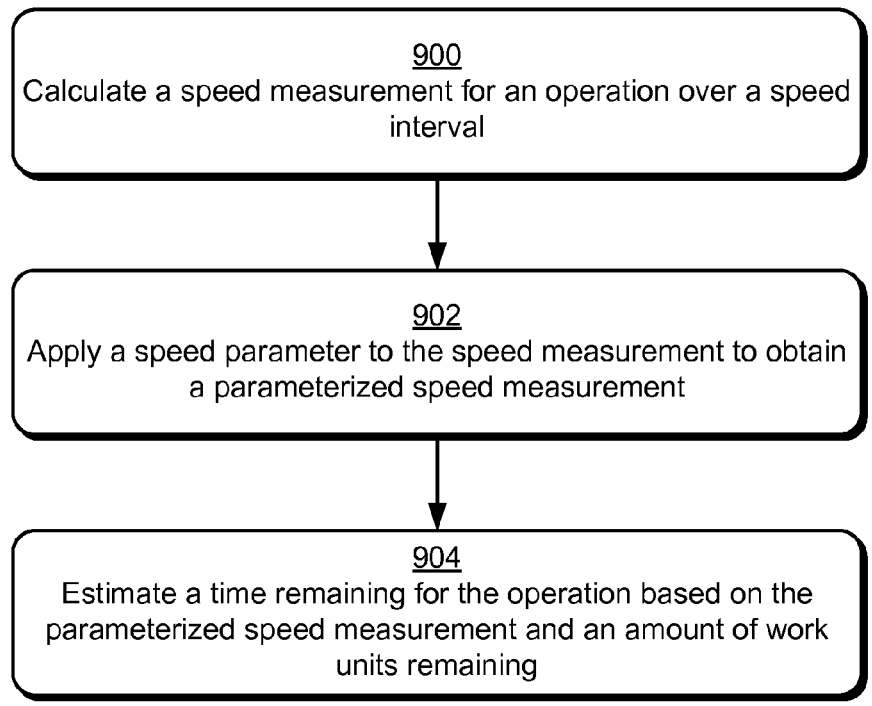
FIG. 9 is a flow diagram that describes steps in a method in accordance with one or more embodiments.

FIG. 9 is a flow diagram that describes steps in a method in accordance with one or more embodiments. According to at least some embodiments, the method describes an example implementation of calculating a time remaining for an operation, such as discussed with reference to step 810 of FIG. 8.

Step 900 calculates a speed measurement for an operation over a speed interval. Speed generally refers to a rate at which an operation is occurring. For example, speed can be measured with reference to a data rate, a bit rate, a data transfer rate, and so forth. Speed may also be measured with reference to discrete instances of an object, such as instances of files. For example, a file copy operation can be measured with reference to a rate at which data from the files is being copied, and/or with reference to a number of file instances copied over a specific period of time.

A speed interval corresponds to one of the calculation intervals referenced above. In at least some embodiments, different speed intervals can be defined for different operation states and can correspond to specified time intervals over which speed measurements can be taken. For example, a speed interval for an initiated state can be shorter than a speed interval for an alerted state or a regular state. A speed interval can be defined using any suitable unit, such as in milliseconds, seconds, frames (e.g., with reference to a frame rate and/or a refresh rate), and so on. Thus, in at least some embodiments, multiple speed measurements can be taken during a speed interval, such as according to a defined measurement period. According to one or more embodiments, a speed interval of zero (0) can be set, such that a single speed measurement is taken.

Step 902 applies a speed parameter to the speed measurement to obtain a parameterized speed measurement. Generally, a speed parameter corresponds to an implementation of the calculation parameters discussed above. Thus, in at least some embodiments, different operation states can be associated with different speed parameters.

As referenced above, a speed parameter can be implemented as a weight function that applies different weights to different values to determine an overall weighted value. For instance, consider that multiple speed measurements are taken during the speed interval, as referenced above. A weight function can be applied to the speed measurements such that some of the measurements are weighted differently than others in determining an actual speed of an operation.

For instance, consider a scenario where 10 speed measurements are taken during a speed interval. A weight function can be applied to the speed measurements such that the first 5 measurements are weighted more heavily than the second 5. In at least some implementations, this can prevent spikes in operation speed that may occur from overly influencing an overall speed calculation. This scenario is presented for purpose of example only, and a wide variety of different weight functions can be applied in accordance with various embodiments.

Further to applying a speed parameter, speed measurements that are taken during a speed interval and/or weighted according to a weight function can be averaged to obtain a parameterized speed measurement.

Step 904 estimates a time remaining for the operation based on the parameterized speed measurement and an amount of work units remaining. For instance, an amount of work units remaining can be determined by subtracting a value for an amount of work units completed from a work unit total value for the operation. The amount of work units remaining can be divided by the parameterized speed measurement calculated above to get an estimated amount of time remaining for the operation.

For example, consider a scenario where the total work units are 1000 megabytes, 200 megabytes have been completed, and a speed of 50 megabytes per second is calculated. In this scenario, the estimated time remaining is determined to be 16 seconds, i.e., 800 megabytes at 50 megabytes per second.

The estimated time remaining can then be output in various ways, examples of which are discussed above and below.

The method described above provides but one example implementation for estimating time remaining for an operation. For instance, in another implementation, embodiments may simply determine an amount of work units remaining for an operation and divide that by a current speed of the operation (e.g., as individual measurements) to determine an estimated time remaining for the operation. Alternatively or additionally, the weight function discussed above can optionally be omitted, such that a simple average of multiple speed measurements is utilized to calculate an estimated time remaining.

Further, at least some embodiments may employ filters that eliminate measurements (e.g., speed measurements) that vary from an average value by a certain amount. For instance, if a group of speed measurements are taken during a speed interval (as detailed above), a measurement that various from others of the measurements by a certain percentage can be ignored for purpose of averaging measurements together to get an overall speed measurement.

Figure 10:
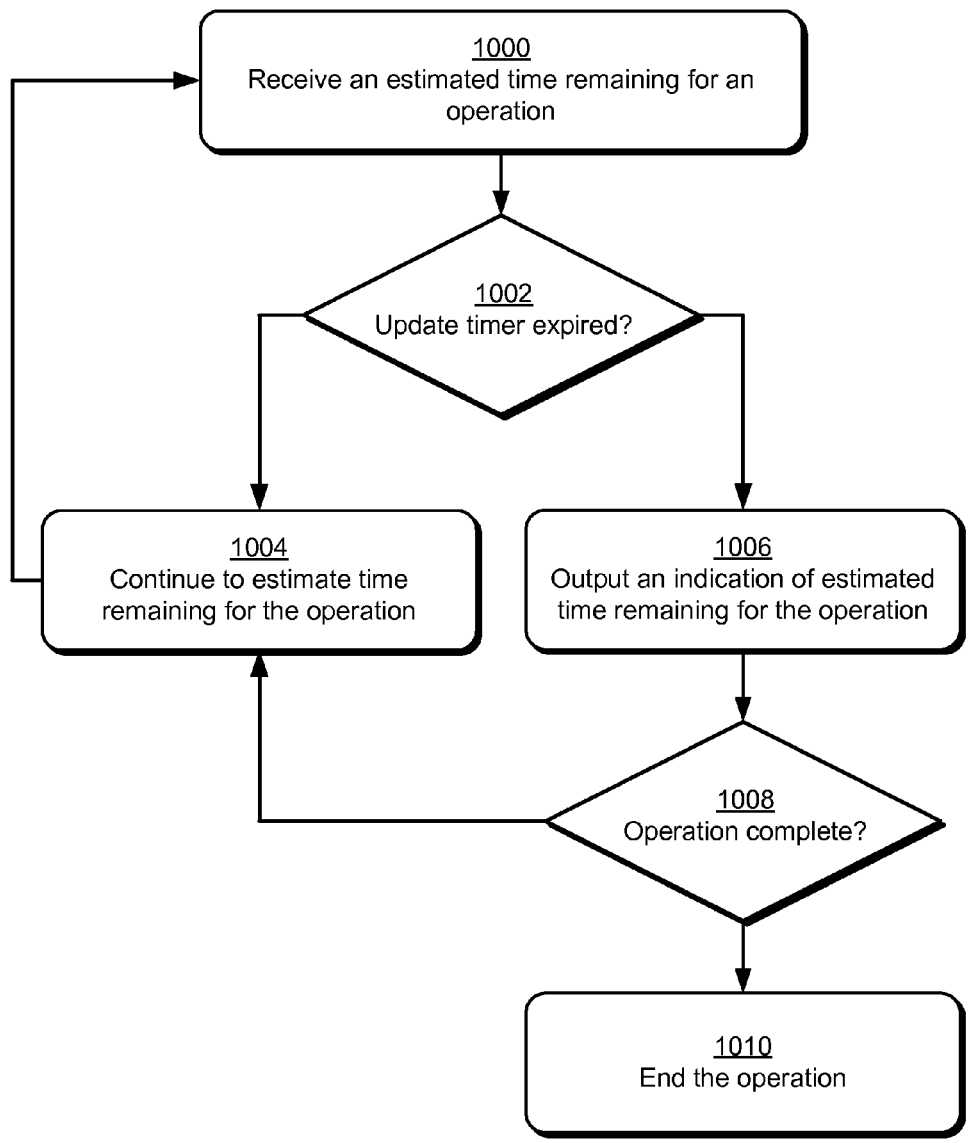
FIG. 10 is a flow diagram that describes steps in a method in accordance with one or more embodiments.

FIG. 10 is a flow diagram that describes steps in a method in accordance with one or more embodiments. According to at least some embodiments, the method describes an example implementation of outputting an estimated time remaining, such as discussed with reference to step 710 of FIG. 7.

Step 1000 receives an estimated time remaining for an operation. For instance, the time remaining can be estimated utilizing techniques discussed herein. Step 1002 determines whether an update timer is expired. In at least some embodiments, different update timers can be used based on how much time is remaining for an operation. For instance, update timers can be specified based on various time remaining thresholds.

For instance, if an operation has more than an hour remaining to completion, an update timer of one minute can be specified. If an operation has less than an hour but more than 10 minutes, an update timer of 30 seconds can be specified. If an operation has less than 10 minutes but more than 1 minute, and update timer of 15 seconds can be specified. If an operation has less than 1 minute, an update timer of 5 seconds can be specified. These update timers are presented for purpose of example only, and a wide variety of different timers can be implemented in accordance with the claimed embodiments.

If the update timer is not expired, step 1004 continues to estimate time remaining for the operation. For instance, the methods discussed above can be reiterated to determine a most recent time remaining estimate.

If the update timer is expired ("Yes"), step 1006 outputs an indication of the estimated time remaining for the operation. The output can include a visual display, an audible output, and/or any other suitable form of output.

Step 1008 determines whether the operation is complete. If the operation is complete ("Yes"), step 1010 ends the operation. If the operation is not complete ("No"), the process proceeds to step 1004 and continues to estimate time remaining for the operation. According to various embodiments, execution of step 1004 causes a return to step 700 of FIG. 7 such that more recent time remaining values can be estimated and indicia of estimated time remaining can be output until an operation is completed.

Other Embodiments

Embodiments discussed herein may be employed for purposes other than file and data operations, such as those discussed above. For instance, embodiments can be utilized to track values, progress, and time to completion for various other types of tasks and/or operations, such as product development, construction, data processing (e.g., compiling tasks), sociological phenomena (e.g., population movement), product shipping, and so forth. Thus, completion time can be estimated and re-estimated according to embodiments discussed herein.

Example System and Device

Figure 11:
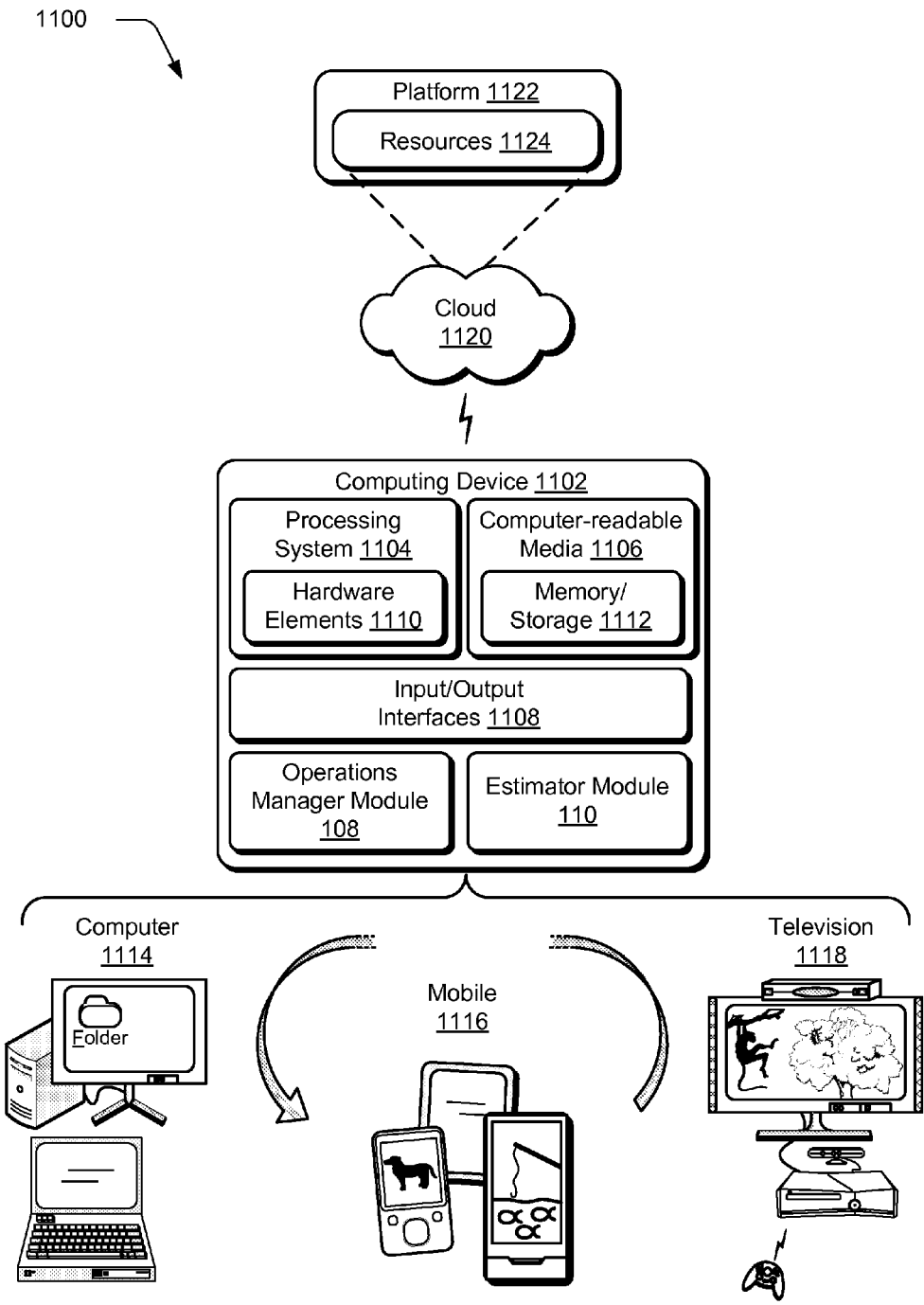
FIG. 11 illustrates an example system and computing device as described with reference to FIG. 1, which are configured to implement embodiments of techniques described herein.

FIG. 11 illustrates an example system generally at 1100 that includes an example computing device 1202 that is representative of one or more computing systems and/or devices that may implement various techniques described herein. For example, the computing device 102 discussed above with reference to FIG. 1 can be embodied as the computing device 1102. The computing device 1102 may be, for example, a server of a service provider, a device associated with the client (e.g., a client device), an on-chip system, and/or any other suitable computing device or computing system.

The example computing device 1102 as illustrated includes a processing system 1104, one or more computer-readable media 1106, and one or more Input/Output (I/O) Interfaces 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1106 is illustrated as including memory/storage 1112. The memory/storage 1112 represents memory/storage capacity associated with one or more computer-readable media. The memory/storage 1112 may include volatile media (such as random access memory (RAM)) and/or nonvolatile media (such as read only memory (ROM), Flash memory, optical disks, magnetic disks, and so forth). The memory/storage 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1110 and computer-readable media 1106 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of modules that are executable by the computing device 1102 as software may be achieved at least partially in hardware, e.g., through use of computer-readable storage media and/or hardware elements 1110 of the processing system. The instructions and/or functions may be executable/operable by one or more articles of manufacture (for example, one or more computing devices 1102 and/or processing systems 1104) to implement techniques, modules, and examples described herein.

As further illustrated in FIG. 11, the example system 1100 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1100, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1102 may assume a variety of different configurations, such as for computer 1114, mobile 1116, and television 1118 uses. Each of these configurations includes devices that may have generally different constructs and capabilities, and thus the computing device 1102 may be configured according to one or more of the different device classes. For instance, the computing device 1102 may be implemented as the computer 1114 class of a device that includes a personal computer, desktop computer, a multi-screen computer, laptop computer, netbook, and so on.

The computing device 1102 may also be implemented as the mobile 1116 class of device that includes mobile devices, such as a mobile phone, portable music player, portable gaming device, a tablet computer, a multi-screen computer, and so on. The computing device 1102 may also be implemented as the television 1118 class of device that includes devices having or connected to generally larger screens in casual viewing environments. These devices include televisions, set-top boxes, gaming consoles, and so on.

The techniques described herein may be supported by these various configurations of the computing device 1102 and are not limited to the specific examples of the techniques described herein. For example, functionalities discussed with reference to the operations manager module 108 and/or the estimator module 110 may be implemented all or in part through use of a distributed system, such as over a "cloud" 1120 via a platform 1122 as described below.

The cloud 1120 includes and/or is representative of a platform 1122 for resources 1124. The platform 1122 abstracts underlying functionality of hardware (e.g., servers) and software resources of the cloud 1120. The resources 1124 may include applications and/or data that can be utilized while computer processing is executed on servers that are remote from the computing device 1102. Resources 1124 can also include services provided over the Internet and/or through a subscriber network, such as a cellular or Wi-Fi network.

The platform 1122 may abstract resources and functions to connect the computing device 1102 with other computing devices. The platform 1122 may also serve to abstract scaling of resources to provide a corresponding level of scale to encountered demand for the resources 1124 that are implemented via the platform 1122. Accordingly, in an interconnected device embodiment, implementation of functionality described herein may be distributed throughout the system 1100. For example, the functionality may be implemented in part on the computing device 1102 as well as via the platform 1122 that abstracts the functionality of the cloud 1120.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for estimating time remaining for an operation are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. One or more computer-readable storage media comprising instructions stored thereon that, responsive to execution by a computing device, cause the computing device to perform operations comprising:
    ascertaining a state of an operation;
    estimating a time remaining for the operation based on a number of work units completed for the operation, the state of the operation, and a weight function applied to the number of work units completed for the operation; and
    updating a time estimate indicator for the operation based on the estimated time remaining for the operation.

2. One or more computer-readable storage media as recited in claim 1, wherein the operation comprises one or more file operations.

3. One or more computer-readable storage media as recited in claim 1, wherein the state of the operation comprises at least one of:
    an initiation state at the beginning of the operation;
    an alerted state that occurs based on one or more events that affect the operation; or
    a regular state that occurs when the operation is ongoing for a particular period of time after the initiation state and without experiencing an alert event.

4. One or more computer-readable storage media as recited in claim 1, wherein said estimating comprises:
    retrieving a calculation interval and a speed parameter based on the state of the operation;
    calculating one or more speed measurements for the operation over a speed interval;
    applying the speed parameter to the one or more speed measurements to obtain a parameterized speed measurement; and
    estimating the time remaining based on the parameterized speed measurement and an amount of work units remaining for the operation.

5. One or more computer-readable storage media as recited in claim 1, wherein the state of the operation comprises a resume state after the operation is paused, and wherein said updating comprises providing a visual indication that the time remaining for the operation is being recalculated.

6. One or more computer-readable storage media as recited in claim 5, wherein the operation is paused responsive to a selection of a pause functionality for the operation, and wherein the resume state occurs in response to a selection of a resume functionality for the operation.

7. One or more computer-readable storage media as recited in claim 5, wherein the operation is paused responsive to a request for user input that occurs during the operation, and wherein the resume state occurs in response to an indication that the user input is provided.

8. One or more computer-readable storage media as recited in claim 1, wherein state of the operation comprises an alerted state that occurs in response to at least one of a different operation being initiated, a different operation being completed, a different operation being paused, or a different operation being resumed.

9. A device comprising:
   at least one processor; and
   one or more computer-readable storage media including instructions stored thereon that, responsive to execution by the at least one processor, cause the device to perform operations comprising:
   calculating speed measurements for an operation over a speed interval;
   applying a speed parameter to the speed measurements to obtain a parameterized speed measurement, the speed parameter being based at least in part on a state of the operation, the speed parameter comprising a weight function that is applied to the speed measurements; and
   estimating a time remaining for the operation based on the parameterized speed measurement and an amount of work units remaining for the operation.

10. A device as recited in claim 9, wherein the speed interval comprises a specified time interval during the operation that is determined based on the state of the operation.

11. A device as recited in claim 9, wherein said applying comprises averaging the speed measurements after the weight function is applied.

12. A device as recited in claim 9, wherein the state of the operation comprises at least one of:
    an initiation state at the beginning of the operation;
    an alerted state that occurs based on one or more events that affect the operation; or
    a regular state that occurs when the operation is ongoing for a particular period of time after the initiation state and without experiencing an alert event.

13. A device as recited in claim 9, wherein the state of the operation comprises an alerted state that occurs in response to at least one of a different operation being initiated, a different operation being completed, a different operation being paused, or a different operation being resumed.

14. A device as recited in claim 9, wherein the operations further comprise updating a time remaining indicator for the operation with the time remaining.

15. A computer-implemented method, comprising:
    outputting a graphical user interface that includes visual indicia of progress of an operation;
    receiving an indication of a state of the operation;
    retrieving a speed parameter and a speed interval based on the state of the operation;
    calculating a speed measurement of the operation over the speed interval;
    applying the speed parameter to the speed measurement to obtain a parameterized speed measurement, the speed parameter comprising a weight function that is applied to the speed measurements;
    estimating a time remaining for the operation based on the parameterized speed measurement and an amount of work units remaining for the operation; and
    updating one or more of the visual indicia based on the time remaining.

16. A method as described in claim 15, wherein the graphical user interface further includes visual indicia of progress of a different operation, and wherein said receiving the indication of the state of the operation is responsive to a state of the different operation.

17. A method as described in claim 15, wherein the state of the operation comprises a resume state that occurs after the operation is paused, and wherein said updating includes providing a visual indication that the time remaining is being recalculated.

18. A method as described in claim 17, wherein the operation is paused responsive to a selection of a pause functionality for the operation, and wherein the resume state occurs in response to a selection of a resume functionality for the operation.

19. A method as described in claim 15, wherein said calculating comprises calculating multiple speed measurements for the operation over the speed interval, and wherein the speed parameter is applied by averaging the multiple speed measurements to obtain the parameterized speed measurement.

20. A method as described in claim 15, wherein said calculating comprises calculating multiple speed measurements for the operation over the speed interval, and wherein the speed parameter is applied by applying the weight function to the multiple speed measurements to obtain weighted speed measurements, and averaging the weighted speed measurements to obtain the parameterized speed measurement.

* * * * *